No. 669,049. Patented Feb. 26, 1901.
W. H. ST. JOHN & O. W. WAIT.
RUBBER TIRE FOR BICYCLES.
(Application filed July 7, 1900.)
(No Model.)
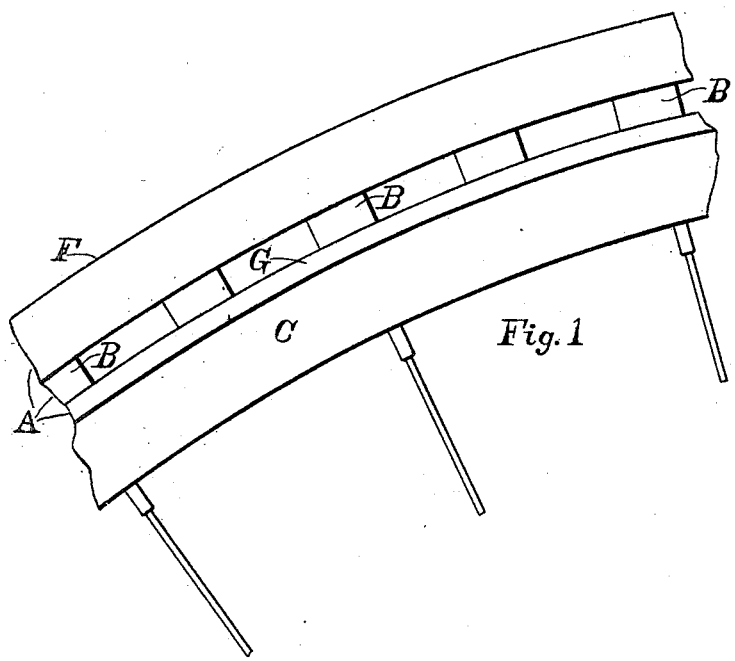
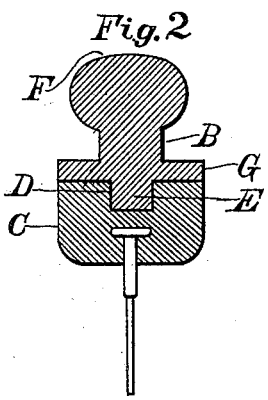
Witnesses
William B. Thomas
R. Clinton Balinger
Inventors:
William H. St. John,
Omer W. Wait,
By Edwin Guthrie
Attorney

UNITED STATES PATENT OFFICE.

WILLIAM HENRY ST. JOHN AND OMER WHITMORE WAIT, OF BROOKLYN, NEW YORK; SAID WAIT ASSIGNOR TO SAID ST. JOHN.

RUBBER TIRE FOR BICYCLES.

SPECIFICATION forming part of Letters Patent No. 669,049, dated February 26, 1901.

Application filed July 7, 1900. Serial No. 22,828. (No model.)

*To all whom it may concern:*

Be it known that we, WILLIAM HENRY ST. JOHN and OMER WHITMORE WAIT, residing in the borough of Brooklyn, in the county of Kings and State of New York, citizens of the United States, have invented a new Solid-Rubber Tire for Bicycles, Light Wagons, and Vehicles of Every Description; and we do hereby declare the following to be a full, clear, and exact description of the invention, such as will enable others skilled in the art to which it appertains to make and use the same.

Our invention relates to certain improvements in rubber tires for wheels of bicycles, light wagons, and vehicles of every description. The tire is constructed by having a series of rubber cushions continuous around the whole tire equidistant from each other and made fast securely with the outer part as well as the inside part of the tire. When the tire is molded, it is absolutely like a solid piece of rubber. The cushions are permitted to have perfect freedom of action, yielding in every sense to any sudden jar that is likely to take place any moment when in use, which is so desirable; also, it can be made of any strength that may be required for any purpose that it may be used for; also, the danger of puncture is absolutely removed, thereby removing all cause of delay, inconvenience, and expense, which is so common with the present inflated tire.

Referring to the drawings, Figure 1 is a side view showing the rubber tire A resting upon the rim of wood C, with the cushions B, also the outer part of the tire F. Fig. 2 is a sectional view showing all its parts in place.

G is that part of the rubber tire which rests upon the wooden rim C. It also has a tongue E that exactly fits into the groove D, which prevents the tire from shifting sidewise.

F is the outside part of the tire, that comes in contact with the street, which is connected with part G by the cushions B.

The groove D in rim C is continuous around the rim C, as well as the tongue E on the rubber tire A, thereby furnishing the conditions for a most perfect attachment of the rubber tire A. This tire A is further secured to the rim C with adhesive gum in solution, which adds still further protection. Also the tire is made one inch or so shorter in circumference than the wooden rim C, which in conjunction with construction of all its parts prevents it from leaving its proper place, thereby avoiding all danger and delay.

The manner of operation of our invention is of course easily understood from the foregoing description. The advantage derived from its use is the more perfect action of the whole tire. The elasticity of the rubber has the best opportunity for freedom of action. The rubber cushions that are placed between the outside and inside parts of the tire have nothing to prevent them from yielding at any point of contact that will occur when in use. Also all danger of the tire is removed from any puncture, as in the inflated tire, that so frequently happens, causing delay, inconvenience, and expense.

Having therefore described our invention, what we claim as new, and desire to protect by Letters Patent, is—

In an elastic tire the combination of the outer portion or tire F, the flat ring part G having the tongue E, the cushions B connecting the tire portion F and ring G at intervals, the rim C having a groove adapted to admit the tongue E, the said tire portion F with ring part G and cushions B being formed together of the same elastic material making an integral annular piece, the said rim C being constructed of wood thereby permitting ring part G to be cemented upon it, the said rim C and ring part G being of the same width throughout, as described.

WILLIAM HENRY ST. JOHN.
OMER WHITMORE WAIT.

Witnesses:
HOWARD M. FIELD,
ERNEST H. WAY.